(12) United States Patent
Botura et al.

(10) Patent No.: US 7,780,117 B2
(45) Date of Patent: Aug. 24, 2010

(54) AIRCRAFT ENGINE NACELLE ICE PROTECTION SYSTEM

(75) Inventors: Galdemir C. Botura, North Canton, OH (US); David C. Flosdorf, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 980 days.

(21) Appl. No.: 11/456,629

(22) Filed: Jul. 11, 2006

(65) Prior Publication Data
US 2007/0102582 A1    May 10, 2007

Related U.S. Application Data

(60) Provisional application No. 60/699,214, filed on Jul. 14, 2005.

(51) Int. Cl.
*B64D 15/12* (2006.01)
(52) U.S. Cl. .................. 244/134 D; 244/134 R
(58) Field of Classification Search ............. 244/134 R, 244/134 E, 1 R, 123.1, 121
See application file for complete search history.

(56) References Cited

U.S. PATENT DOCUMENTS

| | | | |
|---|---|---|---|
| 4,540,143 A | 9/1985 | Wang et al. | 244/130 |
| 5,000,399 A | 3/1991 | Readnour et al. | 244/53 |
| 6,027,075 A | 2/2000 | Petrenko | 244/134 |
| 6,338,455 B1 | 1/2002 | Rauch et al. | 244/134 |
| 6,427,946 B1 | 8/2002 | Petrenko | 244/134 |
| 6,563,053 B2 | 5/2003 | Petrenko | 174/110 |
| 6,576,115 B2 | 6/2003 | Petrenko | 205/628 |
| 6,845,943 B2 | 1/2005 | Chambers et al. | 244/103 |
| 6,848,656 B2 | 2/2005 | Linton | 244/134 |
| 6,866,223 B2 | 3/2005 | Chevalier | 244/53 |
| 2005/0006529 A1 | 1/2005 | Moe et al. | 244/134 |
| 2005/0022866 A1 | 2/2005 | Sakurai et al. | 137/15.1 |
| 2005/0023412 A1 | 2/2005 | Baptist et al. | 244/10 |

FOREIGN PATENT DOCUMENTS

| | | |
|---|---|---|
| GB | 1117843 | 2/1966 |
| GB | 2298114 | 2/1996 |
| WO | 2006/136748 | 12/2006 |

OTHER PUBLICATIONS

GB0613616.2; Great Britain Search Report dated Nov. 7, 2006.

*Primary Examiner*—Timothy D Collins

(57) ABSTRACT

A nacelle inlet lip (22) for an aircraft engine (16) comprises a structural body (30) and an ice protection system (60). The ice protection system (60) comprises a plurality of ice-protectors (62, 64, 66) independently controllable to allow inner zones (52, 54, 56) to be operated in different modes, different power levels, different time intervals and/or different energy amounts. In this manner, an inner aft zone (52), an inner mid zone (54), and an inner aft zone (56) can be anti-iced and/or de-iced to best preserve desired airflow patterns, to minimize ice particle shed size, and to optimize power consumption.

20 Claims, 5 Drawing Sheets

US 7,780,117 B2

AIRCRAFT ENGINE NACELLE ICE PROTECTION SYSTEM

RELATED APPLICATION

Figure 1:
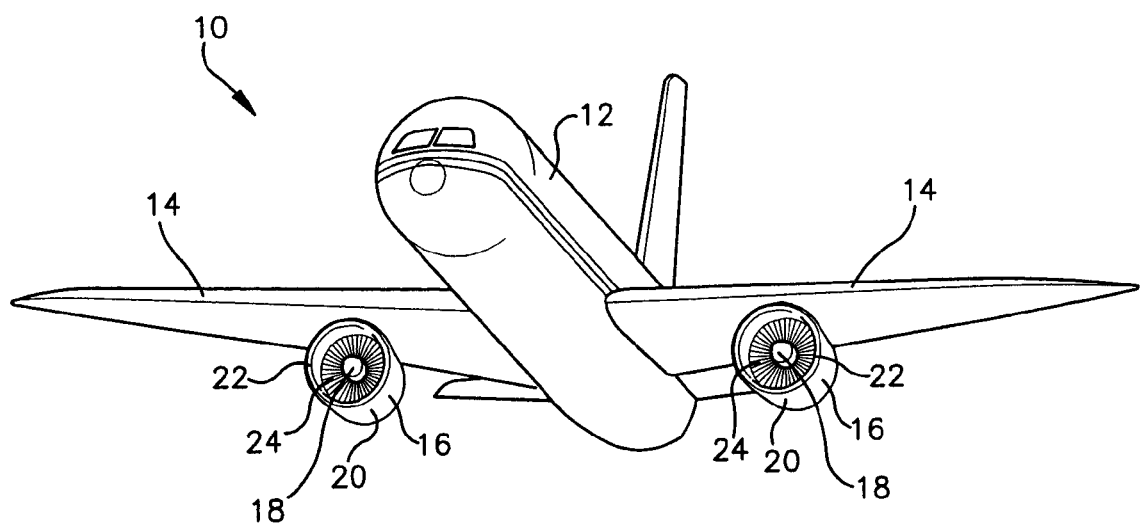

This application claims priority under 35 U.S.C. §119(e) to U.S. Provisional Patent Application No. 60/699,214 filed on Jul. 14, 2005. The entire disclosure of this provisional application is hereby incorporated by reference.

FIELD OF THE INVENTION

This invention relates generally to an aircraft nacelle ice protection system and, more particularly, to an ice protection system which prevents ice build-up on the inlet lip of an engine nacelle.

BACKGROUND OF THE INVENTION

An aircraft typically comprises a fuselage, wings, and engines. Each engine comprises internal engine components (e.g., turbofan components) and a nacelle which houses the internal engine components. Each nacelle includes an inlet lip which defines the inlet opening through which air enters the engine. The formation of ice on the nacelle inlet lip can be a common occurrence during the flight of an aircraft. Ice build-up on the lip can change the contour of the engine's air inlet, thereby adversely affecting air flow patterns (e.g., constricting air flow into the engine) and aerodynamic characteristics (e.g., increasing drag). Moreover, if large pieces of ice break free from the inlet lip and enter the engine, they can damage rotor blades and other internal engine components. Accordingly, it is usually necessary for an aircraft to include some type of nacelle ice protection system.

SUMMARY OF THE INVENTION

The present invention provides a nacelle inlet lip ice protection system which preserves desired airflow patterns (into and around the engine), controls the size of ice particles shed, and optimizes power consumption. The ice protection system can utilize electrical energy to prevent/remove ice whereby problems associated with conventional bleed air heating (i.e., elevated temperature operation, thermal expansion accommodations, structural integrity considerations, pressure relief door requirements, engine efficiency compromises, etc.) are eliminated. Additionally, the ice protection system of the present invention can be used in conjunction with noise abatement constructions, such as those shown in US 2005/0006529.

More particularly, the present invention provides a nacelle inlet lip for an aircraft engine comprising a structural body and an ice protection system. The structural body defines the leading edge of the aircraft engine and has an inner wall portion defining the inlet for the aircraft engine. The inner wall portion has a plurality of inner zones located sequentially aft from the leading edge (e.g., an inner aft zone, an inner mid zone, and an inner aft zone) and the ice protection system has an ice-protector associated with each of the inner zones. Each ice-protector is independently controllable to allow the inner zones to be operated in different modes, different power levels, and/or different time intervals.

The ice protection system of the present invention can be used on any ice susceptible portion of an aircraft, such as the above-described nacelle inlet lip or a wing or a tail of the aircraft.

These and other features of the invention are fully described and particularly pointed out in the claims. The following descriptive annexed drawings set forth in detail a certain illustrative embodiment of the invention, this embodiment being indicative of but one of the various ways in which the principles of the invention may be employed.

DRAWINGS

Figure 2:
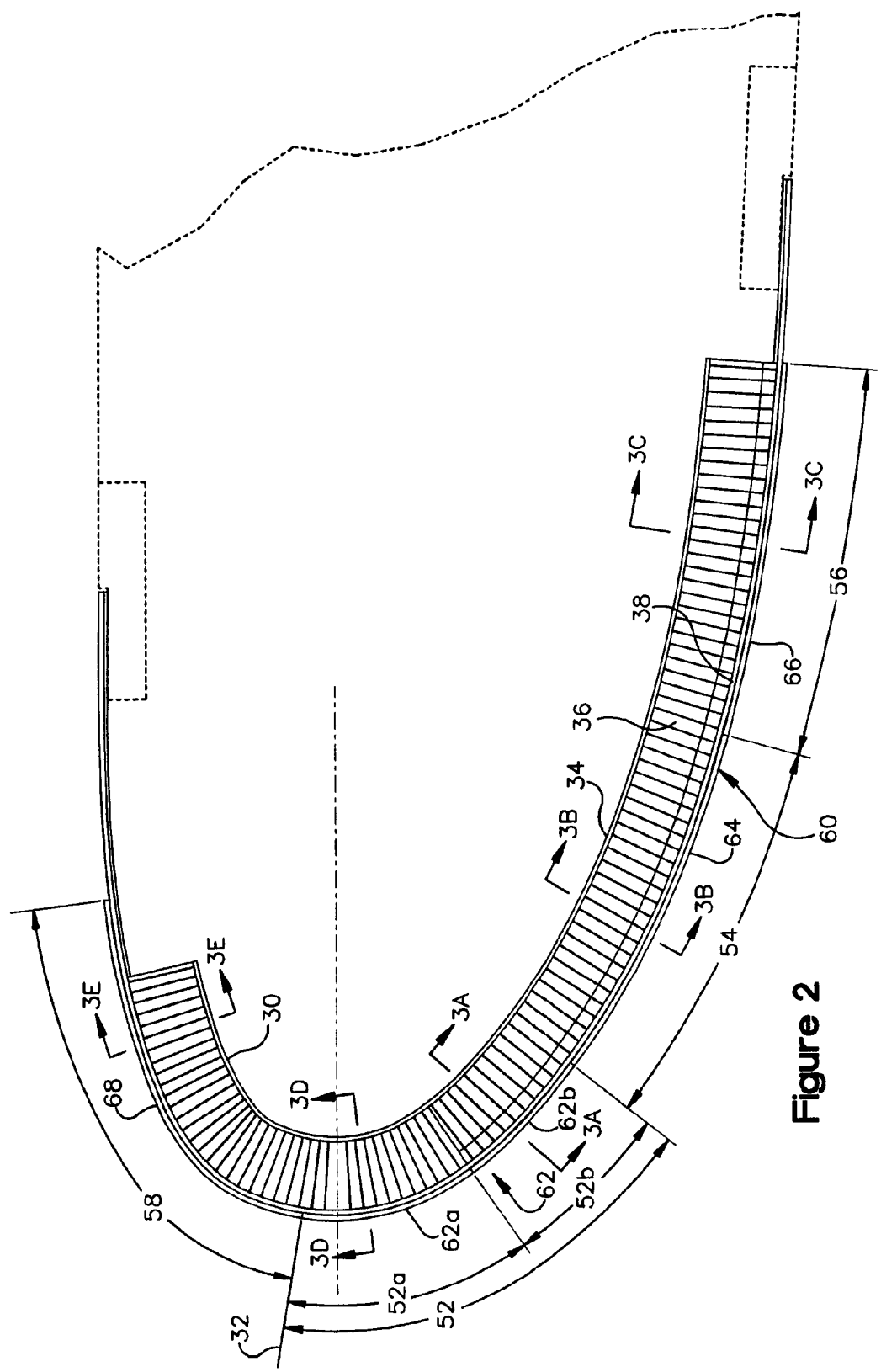
Figure 3A:
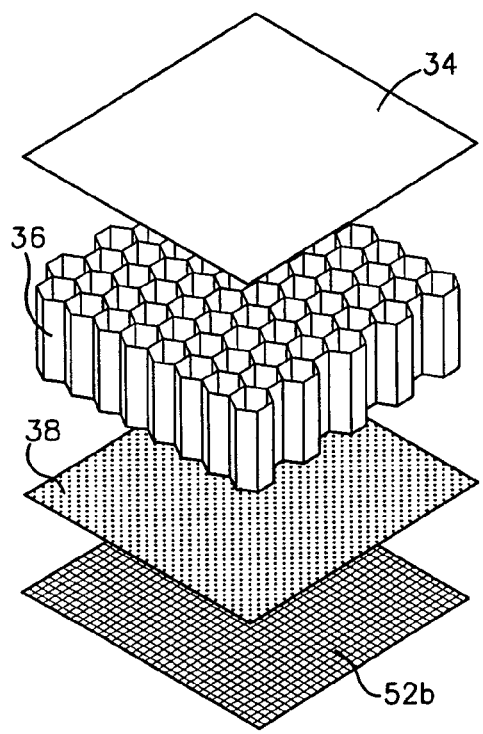
Figure 3B:
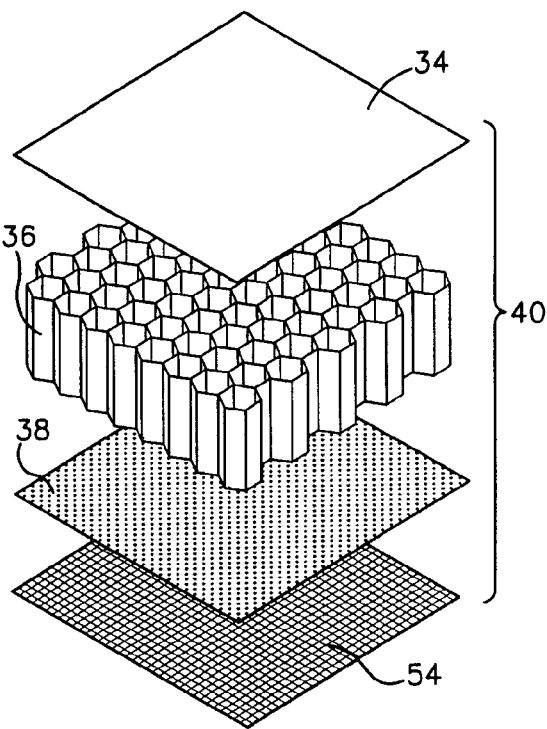
Figure 3C:
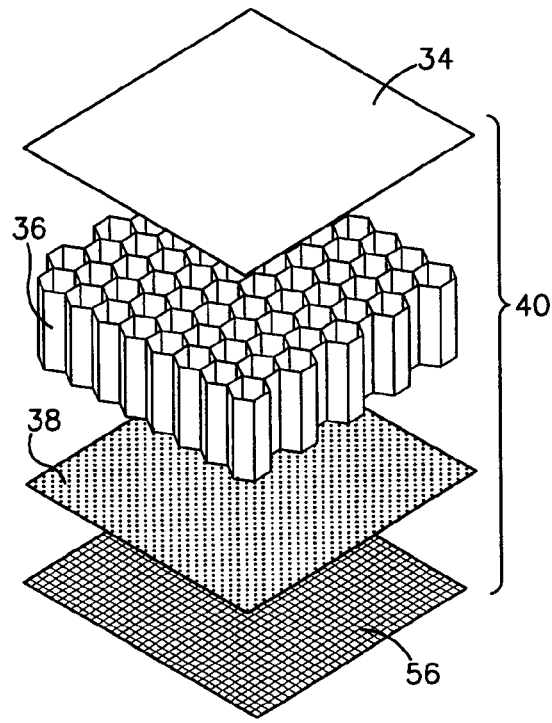
Figure 3D:
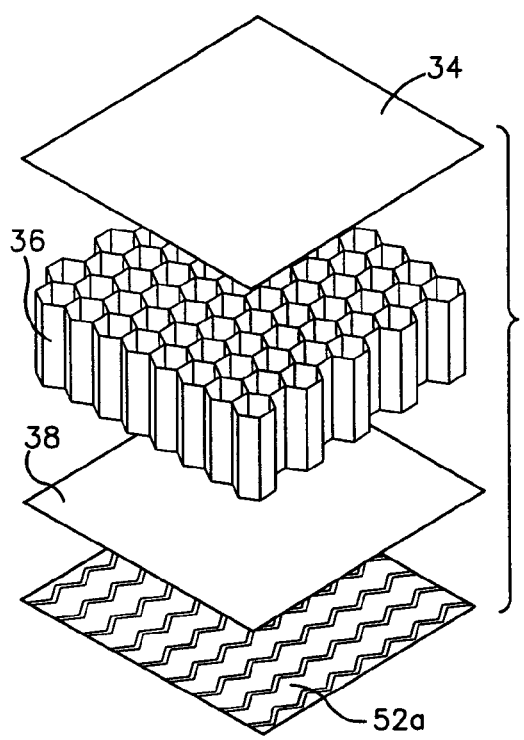
Figure 3E:
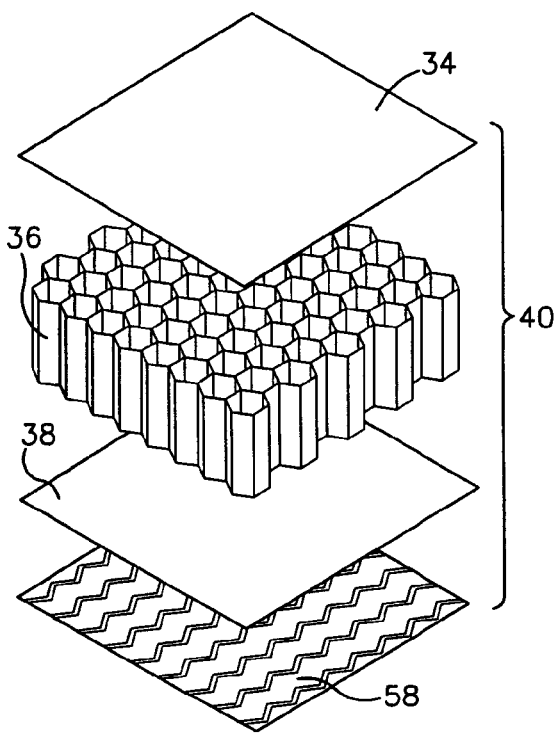
Figure 4:
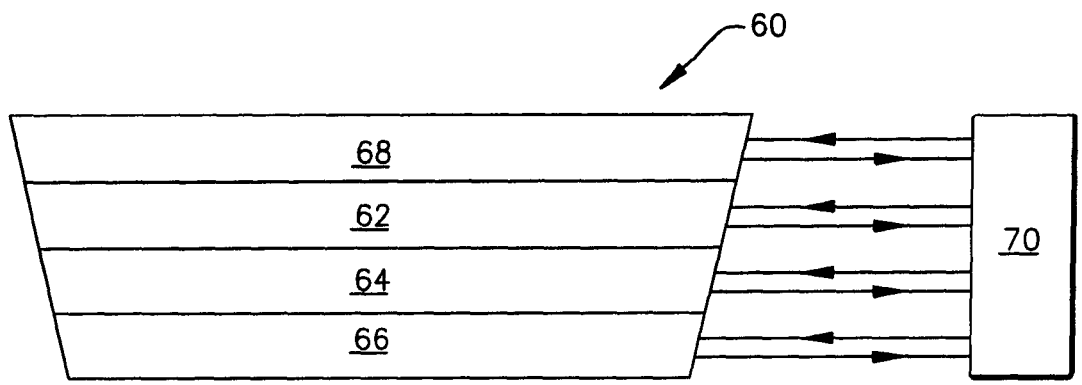
Figure 5:
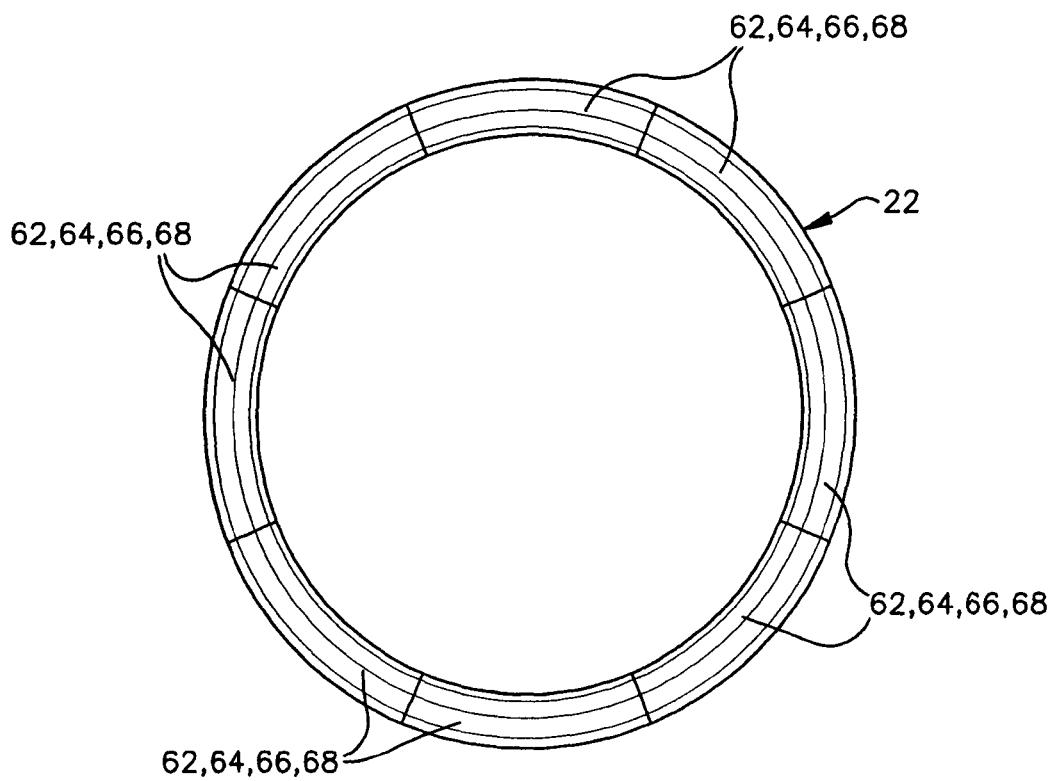

FIG. 1 is a perspective view of an aircraft including a nacelle inlet lip according to the present invention.
FIG. 2 is a cross-sectional view of the nacelle inlet lip.
FIGS. 3A-3E are schematic exploded views of the nacelle inlet lip.
FIG. 4 is a schematic view of the ice protection system.
FIG. 5 is a schematic front view of the nacelle inlet lip.

DETAILED DESCRIPTION

Referring now to the drawings, and initially to FIG. 1, an aircraft 10 is shown. The aircraft 10 comprises fuselage 12, wings 14, and engines 16. Each engine 16 comprises internal engine components 18 (e.g., turbofan components) and a nacelle 20 which houses the internal engine components 18. Each nacelle 20 includes an inlet lip 22 which defines the inlet opening 24 through which air enters the engine 16. In the illustrated aircraft 10, the engines 16 are mounted to the wings 14 and the nacelles 20 would probably be considered relatively large in the aircraft industry (e.g., they each have a diameter that exceeds ten feet). However, the engines 16 could additionally or alternatively be mounted in other aircraft locations, and/or the engines 16 and/or nacelles 20 could be of a variety of sizes.

Referring now to FIG. 2, a cross-section of the nacelle inlet lip 22 is shown. The inlet lip 22 comprises a structural body 30 that defines the leading edge 32 of the nacelle 20 and that is shaped/designed to maximize air flow into the engine 16 and to minimize aerodynamic drag. As is explained in more detail below, the inlet lip 22 has a noise abatement construction such as that shown in US 2005/0006529 (the entire disclosure of which is hereby incorporated by reference) and, to this end, the structural body 30 includes a back skin 34, a honeycomb core 36, and a front skin 38. The structural body 30, and particularly the front skin 38, has an inner wall portion 40 and an outer wall portion 42. The inner wall portion 40 forms the inlet opening 24 through which air travels into the engine 16; the outerwall portion 42 forms the surface over which air travels around the engine 16.

According to the present invention, the inner wall portion 40 is viewed as having a plurality of inner zones which, in the illustrated embodiment, are an inner fore zone 52, an inner mid zone 54, and an inner aft zone 56. The inner fore zone 52 is located just aft of the leading edge 32, the inner mid zone 54 is located just aft of the fore zone 52, and the inner aft zone 56 is located just aft of the mid zone 54. The outer wall portion 42 can be viewed as having an outer zone 58 which extends aft from the leading edge 32 and/or from the inner fore zone 52. It may be noted for future reference that, as illustrated, the inner fore zone 52 (or any other zone for that matter), can be formed from two sub-zones 52a and 52b. It may also be noted for that the inner fore zone 52 can extend slightly beyond the leading edge 32 and onto the outer wall portion 42.

For the illustrated relatively large engine nacelle 20, the inner fore zone 52 can occupy a length of about three to six inches of the inner wall portion 40, the inner mid zone 54 can occupy a length of about four to seven inches of the inner wall portion 40, and the inner aft zone 56 can occupy a length of about four to seven inches of the inner wall portion 40. The outer zone 58 can occupy a length of about four to eight inches of the outer wall portion 42. However, the length of these zones, and the ratio of lengths between these zones, will change depending on the particular aircraft, specific engine construction, selected lip geometry, and/or expected flight conditions. For example, the zones can each occupy a length of about one to twelve inches, more than one inch, and/or less than twelve inches on the respective wall portion 40/42.

According to the present invention, the nacelle lip 22 further comprises an ice protection system 60 having an ice-protector 62/64/66 associated with each of the inner zones 52/54/56. As is explained in more detail below, each ice-protector 62/64/66 is independently controllable to allow the inner zones 52/54/56 to be operated in different modes, different power levels, and/or different time intervals. Preferably, the ice-protectors 62/64/66 prevent/remove ice using electrical energy (either to generate a current bias and/or to generate heat) operated whereby a fluid is not used for deicing or anti-icing purposes (e.g., hot engine air is not used as a heat-carrying medium and/or compressed air is not used as an inflation fluid). The ice-protector 62 for the inner fore zone 52 can comprise, as illustrated, two sub-ice-protectors 62a and 62b for the two sub-zones 52a and 52b. The illustrated ice protection system 60 also includes an ice-protector 68 associated with the outer zone 58, this ice-protector 68 also preferably using electrical energy to prevent/remove ice.

As was indicated above, the inlet lip 22 has noise abatement features and, to this end, its front skin 38 includes perforations in the areas corresponding to a portion of the inner fore zone 52 (sub-zone 52b), the inner mid zone 54, and the inner aft zone 56. (See FIGS. 3A-3C.) The sub-ice-protector 62a for sub-zone 52b, the ice-protector 64 for inner mid zone 54, and the ice-protector 66 for inner aft zone 56 can be of the lower power type shown in U.S. Pat. No. 6,027,075, the entire disclosure of which is hereby incorporated by reference. With this type of ice-protector, a direct current source is used to generate a direct current bias to the ice interface that advantageously modifies ice adhesion strength. The ice-protectors 62a/64/66 can each comprise an electrically conductive material that is permeable to sound waves (e.g., a fine grid wire mesh) that is bonded to the outer surface of the perforated skin 38 in such a manner that it does not block or otherwise interfere with a significant number of perforations. (See FIGS. 3A-3C.)

The rest of the front skin 38, including the areas corresponding to sub-zone 52a and the outer zone 58, are unperforated (i.e., solid). (See FIGS. 3D and 3E.). The sub-ice-protector 62a and the ice-protector 68 can be conventional electrothermal heaters, that is they can each comprise a sheet-like substrate having conductive heating elements printed or otherwise formed thereon. (See FIGS. 3D and 3E.)

The use of different types of ice-protectors for different zones, and the use of two types of protectors 62a and 62b for the inner fore zone 52, can allow optimum ice protection with overall energy conservation. Also, in the illustrated embodiment, the ice-protectors 62b, 64 and 66 employed in zones 52b, 54, and 56 accommodates the noise abatement features of the inlet lip 22. Specifically, for example, the separation of the inner fore zone 52 into sub-zones 52a and 52b allowed for a grid protector to be used in the sub-zone 52b having the perforated skin 38 and allowed for an electrothermal heater to be used in the sub-zone 52a having the solid skin 38.

That being said, the ice-protectors 62/64/66/68 can be of any form, the same or different, that provides the desired ice protection features for the respective zone 52/54/56/58. It may also be noted that the ice-protectors 62/64/66/68 need not be separate screens or sheets bonded to the structural body 30 of the inlet lip 22 but could instead, for example, be embedded or otherwise incorporated into the front skin 38.

According to the present invention, and as is shown schematically, each of the ice-protectors 62/64/66/68 is independently controllable to allow the inner zones to be operated in different modes, different power levels, and/or different time intervals. For example, as shown schematically in FIG. 4, each ice-protector 62/64/66/68 can separately provide temperature data to a controller 70 and the controller 70 can separately supply power, and/or control the energy supplied, to each of the ice-protectors 62/64/66/68. This allows each ice-protector 62/64/66/68 to receive only the necessary amount of power and only for the necessary amount of time to accomplish the desired ice protection result in the respective zone 52/54/56/58.

As for modes of operation, each ice-protector 62/64/66/68 can be operated in one of an anti-icing mode or a deicing mode, and at least one ice-protector 66 can be operated in either an anti-icing mode or a deicing mode. In an anti-icing mode, power is continuously supplied to the ice-protector to prevent the accumulation of ice in the corresponding zone. In the deicing mode, power is intermittently provided to the ice-protector to remove accumulated ice (which formed when power/heat was not being provided) from the respective zone.

The mode in which each ice-protector 62/64/66/68 is operated during a particular period is chosen to preserve desired airflow patterns, to control the size of ice particles shed, and to optimize power consumption. For example, the ice-protector 62 for the inner fore zone 52 can always be in an anti-icing mode to maintain the airflow pattern into the inlet to preserve engine performance parameters.

The ice-protector 64 for the inner mid zone 54 can be operated in either anti-icing mode or deicing mode, depending upon flight conditions. For example, in warm temperatures (e.g., above about −4° F.), the ice-protector 64 for the inner mid zone 54 can operate in an anti-icing mode and, in cold temperatures (e.g., below about −4° F.) the ice-protector 64 for the inner mid zone 54 can operate in a de-icing mode. In warm temperatures, a small amount of power/energy will be required to prevent ice accumulation and enough heat can be transferred by impinging water droplets to minimize runback. In cold temperatures, runback from the inner fore zone 52 will freeze on the inner mid zone 54 and then be shed during deicing, in very thin frost-like layers, due to reduced liquid water content. When in the deicing mode, during cold conditions, power/heat/energy can be supplied to the ice-protector 64 for the inner mid zone 54 for an appropriate period. For example, the power/heat/energy can be supplied for a period of about 5% to 25% of cycle time, for a period of about five to forty seconds, about ten to thirty seconds, and/or about fifteen to about twenty-five seconds.

The ice-protector 66 for the inner aft zone 56 can be operated in a deicing mode to shed any run back from the inner mid zone 54 that freezes thereon. The deicing interval should be chosen such that maximum ice accumulation in this area is always minimum so that inlet geometry is not compromised and so that ice is shed in small sizes. For example, in warm conditions (when the ice-protector 62 for the inner mid zone 54 operates in an anti-icing mode), power would be supplied to the ice-protector 56 for the inner aft zone 46 for an appropriate period of time. (e.g., about 20% to 30% of cycle time, for a period of about ten to fifty seconds, about twenty to forty seconds, and/or about twenty-five to thirty-five seconds). In cold conditions (when the ice-protector 64 for the inner mid zone 54 is also in a deicing mode), power/heat/energy could be supplied to the ice-protector 66 for the inner aft zone 56 for an appropriate period (e.g., about 5% to 25% of cycle time, for a period of about five to forty seconds, about ten to thirty seconds, and/or about fifteen or about twenty-five seconds).

The ice-protector 68 for the outer zone 58 can always be in the deicing mode to remove accumulated ice, as icing in this area affects aerodynamic drag, not engine performance. When in the deicing mode, power can be supplied to the ice-protector 66 for the outer zone 58 for about 5% to 25% of cycle time, for a period of about five to forty seconds, about ten to thirty seconds, and/or about fifteen to about twenty-five seconds.

As shown schematically in FIG. 4, the ice protection system 60 can have a plurality (e.g., eight) of arcuate sections, with each section having an ice-protector 62, an ice-protector 64, an ice-protector 66, and an ice-protector 68 arranged around the circumference of the inlet lip 22. The ice-protectors can all be controlled by the same controller (e.g., controller 70). In so, and/or in any event, power can be supplied sequentially to different ice-protector sections when a zone is being deiced to minimize total power consumption. (When a zone is being anti-iced, power would be supplied to all of the corresponding ice-protector sections.)

One may now appreciate that the present invention provides a nacelle inlet lip ice protection system 60 which preserves desired airflow patterns, controls the size of ice particles shed, and optimizes power consumption. The ice protection system 60 can utilize electrical energy to prevent/remove ice whereby problems associated with conventional bleed air heating are eliminated and/or the ice protection system 60 can be used in conjunction with a noise abatement constructions.

Although the invention has been shown and described with respect to a certain preferred embodiment, it is obvious that equivalent and obvious alterations and modifications will occur to others skilled in the art upon the reading and understanding of this specification. For example, although the ice protection system of the present invention has been shown in conjunction with a nacelle inlet lip, it can be used on any ice susceptible portion of an aircraft, such as a wing or tail. The present invention includes all such alterations and modifications and is limited only by the scope of the following claims.

The invention claimed is:

1. A nacelle inlet lip for an aircraft engine, comprising a structural body and an ice protection system;
   the structural body defining the leading edge of the aircraft engine and having an inner wall portion defining an inlet for the aircraft engine;
   the inner wall portion having a plurality of inner zones located sequentially aft from the leading edge, these inner zones including an inner fore zone located just aft of the leading edge, an inner mid zone located aft of the inner fore zone, and an inner aft zone located aft of the inner mid zone;
   the ice protection system having an ice-protector associated with each of the inner zones;
   each ice-protector being independently controllable to allow the inner zones to be operated in different modes, different power levels, and/or different time intervals;
   the inner mid zone being operable in an anti-icing mode, wherein power is continuously supplied to its ice-protector to prevent ice from forming on this zone, and a deicing mode, wherein power is intermittently supplied to its ice-protector to remove ice formed on this zone.

2. A nacelle inlet lip as set forth in claim 1, wherein the ice-protectors use electrical energy to prevent/remove ice from the corresponding zones.

3. A nacelle inlet lip in claim 1, wherein the plurality of inner zones include an inner fore zone located just aft of the leading edge, an inner mid zone located just aft of the inner fore zone, and an inner aft zone located just aft of the inner mid zone, and wherein the inner mid zone is operable in the different modes.

4. A nacelle inlet lip as set forth in claim 1, wherein at least some of the ice-protectors comprise a conductive mesh.

5. A nacelle inlet lip as set forth in claim 1, wherein at least some of the ice-protectors comprise heating elements.

6. A nacelle inlet lip as set forth in claim 1, wherein some ice-protectors comprise a conductive mesh and other ice-protectors comprise heating elements.

7. A nacelle inlet lip as set forth in claim 1, wherein one of the inner zones includes sub-zones and wherein the ice-protector for this zone comprises sub-ice-protectors corresponding to these sub-zones.

8. A nacelle inlet lip as set forth claim 1, wherein one sub-ice-protector comprises heating elements and the other sub-ice-protector comprises a conductive mesh.

9. An aircraft engine comprising internal engine components and a nacelle housing the internal engine components, wherein the nacelle includes an inlet lip as set forth in claim 1.

10. A method of ice-protecting the nacelle inlet lip set forth in claim 1, comprising the steps of:
    supplying power continuously to the ice-protector associated with the inner zone just aft of the leading edge to anti-ice this inner fore zone; and
    selectively supplying power continuously or supplying power intermittently to the ice-protector associated with the inner zone just aft of the inner fore zone to selectively anti-ice or de-ice this inner mid zone.

11. A nacelle inlet lip as set forth in claim 1, wherein the inner aft zone is operable in a de-icing mode wherein power is intermittently supplied to its ice protector to remove ice formed on this zone.

12. A nacelle inlet lip as set forth in claim 1, wherein the inner fore zone is operable in an anti-icing mode wherein power is continuously supplied to its ice protector to prevent ice from forming on this zone.

13. A nacelle inlet lip as set forth in claim 12, wherein the inner aft zone is operable in a de-icing mode wherein power is intermittently supplied to its ice protector to remove ice formed on this zone.

14. A nacelle inlet lip as set forth in claim 1, wherein the structural body comprises an outer wall portion over which air travels around the aircraft engine, wherein the outer wall portion includes a zone aft of the leading edge, and wherein the ice protection system includes an ice-protector associated with this outer zone.

15. A nacelle inlet lip as set forth in claim 14, wherein the ice-protector associated with the outer zone is an electrothermal heater.

16. A nacelle inlet lip as set forth in claim 14, wherein the ice-protector associated with the outer zone is controllable independent of the inner zones whereby it can operated at different power levels and/or for different time intervals.

17. A nacelle inlet lip as set forth in claim 1, wherein the structural body comprises a back skin, a honeycomb core, and a front skin, and wherein portions of the front skin are perforated.

18. A nacelle inlet lip as set forth in claim 17, wherein at least some of the inner zones are located in the portions of the front skin that are perforated and wherein the ice-protectors for these zones comprise a conductive mesh.

19. A nacelle inlet lip as set forth in claim 17, wherein at least one inner zone has a sub-zone located on portions of the front skin which are perforated and a sub-zone located on portions of the front skin that are unperforated, wherein the ice-protector for the inner zone includes a sub-ice-protector for the sub-zone and a sub-ice-protector for the sub-zone, and wherein the sub-ice-protector comprises a conductive mesh and the sub-ice-protector comprises heating elements.

20. An ice-susceptible portion of an aircraft, comprising a structural body and an ice protection system;

the structural body defining a leading edge and having a wall portion with a plurality of zones located sequentially aft from the leading edge, these zones including a fore zone located just aft of the leading edge, a mid zone located aft of the fore zone, and an zone located aft of the mid zone;

the ice protection system having an ice-protector associated with each of the zones;

each ice-protector being independently controllable to allow the zones to be operated in different modes, different power levels, and/or different time intervals;

the ice protector associated with the fore zone operable in an anti-icing mode wherein power is continuously supplied to this ice-protector to prevent ice from forming on this zone, the ice protector associated with the mid zone operable in an anti-icing mode wherein power is continuously supplied to this ice-protector to prevent ice from forming on this zone and is also operable in a deicing mode wherein power is intermittently supplied to this ice-protector to remove ice formed on this zone, and the ice protector associated with the aft zone operable in a de-icing mode wherein power is intermittently supplied to this ice-protector to remove ice formed on this zone.

* * * * *